(12) United States Patent
Matsugi et al.

(10) Patent No.: US 9,797,620 B2
(45) Date of Patent: Oct. 24, 2017

(54) VENTILATION DEVICE

(71) Applicant: DAIKIN INDUSTRIES, LTD., Osaka-shi, Osaka (JP)

(72) Inventors: Yoshitaka Matsugi, Osaka (JP); Kenichi Maegaito, Osaka (JP); Takayuki Sunayama, Osaka (JP); Tooru Fujimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/115,577

(22) PCT Filed: Jan. 28, 2015

(86) PCT No.: PCT/JP2015/000374
§ 371 (c)(1),
(2) Date: Jul. 29, 2016

(87) PCT Pub. No.: WO2015/115097
PCT Pub. Date: Aug. 6, 2015

(65) Prior Publication Data
US 2017/0159963 A1 Jun. 8, 2017

(30) Foreign Application Priority Data

Jan. 31, 2014 (JP) .................. 2014-017356

(51) Int. Cl.
*F24F 12/00* (2006.01)
*F24F 11/04* (2006.01)
(Continued)

(52) U.S. Cl.
CPC ........ *F24F 12/006* (2013.01); *F24F 11/0012* (2013.01); *F24F 11/0015* (2013.01);
(Continued)

(58) Field of Classification Search
CPC .. F24F 12/006; F24F 11/0012; F24F 11/0015; F24F 11/04; F24F 2011/0013; F24F 2013/221
See application file for complete search history.

(56) References Cited

U.S. PATENT DOCUMENTS 3,666,007 A * 5/1972 Yoshino ............. B60H 1/00021
165/122
5,632,334 A * 5/1997 Grinbergs ............. F24F 12/006
165/232
(Continued)

FOREIGN PATENT DOCUMENTS

EP 0 414 231 A2 2/1991
JP 3-37344 U 4/1991
(Continued)

*Primary Examiner* — Tho V Duong
(74) *Attorney, Agent, or Firm* — Birch, Stewart, Kolasch & Birch, LLP

(57) ABSTRACT

A total heat exchanger exchanges heat between air flowing through an air supply passage and air flowing through an air exhaust passage. An air supply fan transfers air from the outside of a room into the room through the air supply passage. If the temperature of outdoor air (OA) is below a lower temperature threshold (Tth), a controller intermittently stops the air supply fan in response to an index of the moisture content in room air (RA) such that as the stage of the index of the moisture content depending on the moisture content in the room air (RA) shifts toward higher stages, the period of time during which the air supply fan is at rest in an intermittent operating cycle increases.

18 Claims, 7 Drawing Sheets

(51) Int. Cl.
   *F24F 11/00* (2006.01)
   *F24F 13/22* (2006.01)
(52) U.S. Cl.
   CPC ....... *F24F 11/04* (2013.01); *F24F 2011/0013* (2013.01); *F24F 2011/0073* (2013.01); *F24F 2013/221* (2013.01)

(56) References Cited

U.S. PATENT DOCUMENTS

| | | | | |
|---|---|---|---|---|
| 6,983,794 | B2 * | 1/2006 | Fujimoto | .............. F24F 12/006 165/231 |
| 2004/0177627 | A1 | 9/2004 | Fujimoto | |
| 2010/0286831 | A1 * | 11/2010 | Boudreau | ............. F24F 12/006 700/278 |
| 2013/0090768 | A1 * | 4/2013 | Amundson | .......... F24F 11/0086 700/276 |
| 2014/0007604 | A1 * | 1/2014 | Sakai | .................... F24F 3/1429 62/238.7 |

FOREIGN PATENT DOCUMENTS

| | | | |
|---|---|---|---|
| JP | 4-283333 A | 10/1992 | |
| JP | 10-132359 A | 5/1998 | |
| JP | 2003-74937 A | 3/2003 | |
| JP | 2003-148780 A | 5/2003 | |
| JP | 2008151458 A | 7/2008 | |
| JP | 2008286421 A | 11/2008 | |
| JP | 2008-309381 A | 12/2008 | |
| KR | WO 2008102999 A1 * | 8/2008 | ............ F24F 12/006 |
| WO | WO 2006/071117 A1 | 7/2006 | |

* cited by examiner

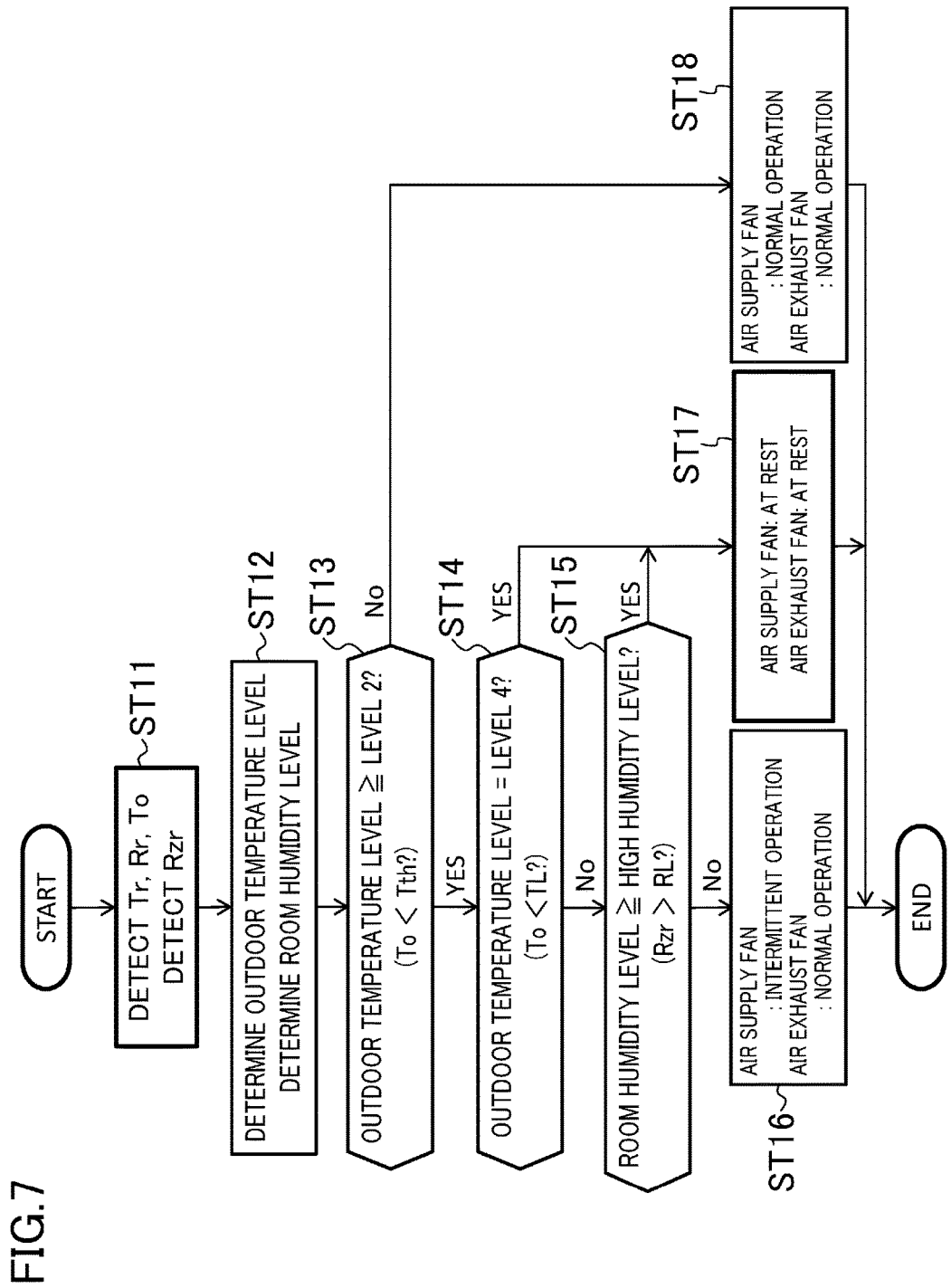

VENTILATION DEVICE

TECHNICAL FIELD

The present disclosure relates to a ventilation device for ventilating a room.

BACKGROUND ART

A conventionally known ventilation device ventilates a room while exchanging heat between outdoor air to be supplied into a room and room air to be exhausted to outside the room. For example, Patent Document 1 describes a ventilation device including a total heat exchanger allowing total heat exchange to occur between outdoor air flowing through an air supply passage and room air flowing through an air exhaust passage. If the concentration of volatile organic compounds (VOC) in a room is higher than a predetermined value, the ventilation device of Patent Document 1 determines whether the total heat exchanger has a region having a temperature lower than or equal to the dew point, based on temperature/humidity conditions inside and outside the room. In this case, if the total heat exchanger has a region having a temperature lower than or equal to the dew point, the ventilation device performs an operation for increasing the volume of ventilation air blown. This can facilitate discharging the volatile organic compounds to outside the room, and can reduce the concentration of the volatile organic compounds in the room to a level at which residents do not feel uncomfortable.

CITATION LIST

Patent Document

PATENT DOCUMENT 1: Japanese Unexamined Patent Publication No. H10-132359

SUMMARY OF THE INVENTION

Technical Problem

Unfortunately, if the temperature of outdoor air is low, and the humidity of room air is high, freezing of the total heat exchanger of the ventilation device of Patent Document 1 may progress. Specifically, low-temperature outdoor air supplied from outside the room cools the total heat exchanger, and high-humidity room air exhausted from inside the room passes through the cooled total heat exchanger. This may cause freezing of condensed water produced in the total heat exchanger to progress.

It is therefore an object of the present disclosure to provide a ventilation device capable of reducing the degree to which freezing of a total heat exchanger progresses.

Solution to the Problem

A first aspect of the disclosure provides a ventilation device including: an air supply passage (11) through which outdoor air (OA) is supplied into a room; an air exhaust passage (12) through which room air (RA) is exhausted to an outside of the room; an air supply fan (13) configured to transfer air from the outside of the room into the room through the air supply passage (11); a total heat exchanger (15) configured to allow total heat exchange to occur between air flowing through the air supply passage (11) and air flowing through the air exhaust passage (12); a room temperature sensor (41) configured to detect a temperature (Tr) of the room air (RA); a room humidity sensor (42) configured to detect a relative humidity (Rr) of the room air (RA); an outdoor temperature sensor (43) configured to detect a temperature (To) of the outdoor air (OA); and a controller (60) configured to detect an index of a moisture content that depends on the moisture content in the room air (RA) based on the temperature (Tr) and relative humidity (Rr) of the room air (RA) detected by the room temperature sensor (41) and the room humidity sensor (42), and to, if the temperature (To) of the outdoor air (OA) detected by the outdoor temperature sensor (43) is below a predetermined lower temperature threshold (Tth), intermittently stop the air supply fan (13) in response to the index of the moisture content in the room air (RA) such that as a stage of the index of the moisture content in the room air (RA) shifts toward higher stages, a period of time during which the air supply fan (13) is at rest in an intermittent operating cycle increases.

In the first aspect, if the temperature (To) of the outdoor air (OA) is below the lower temperature threshold (Tth), the air supply fan (13) is intermittently stopped, thereby reducing the flow rate of the outdoor air (OA) passing through the total heat exchanger (15). This may reduce the degree of cooling of the total heat exchanger (15) by the low-temperature outdoor air (OA).

In addition, in the first aspect, the air supply fan (13) is intermittently stopped. Thus, the degree of decrease in the flow rate of the outdoor air (OA) transferred by the air supply fan (13) (i.e., decrease in ventilation air volume) may become lower than if the air supply fan (13) is continuously at rest.

As the moisture content in the room air (RA) increases, condensation more easily occurs in the total heat exchanger (15), and freezing of the total heat exchanger (15) more easily progresses. Moreover, as the period of time during which the air supply fan (13) is at rest in the intermittent operating cycle increases, the ventilation air volume decreases. Thus, in the first aspect, the air supply fan (13) is controlled in response to the index of the moisture content in the room air (RA) such that as the stage of the index of the moisture content in the room air (RA) shifts toward higher stages, the period of time during which the air supply fan (13) is at rest in the intermittent operating cycle increases.

A second aspect of the disclosure is an embodiment of the ventilation device of the first aspect. In this embodiment, the controller (60) may intermittently stop the air supply fan (13) in response to the index of the moisture content in the room air (RA) and the temperature (To) of the outdoor air (OA) such that as the stage of the temperature (To) of the outdoor air (OA) shifts toward lower stages at each of stages of the index of the moisture content in the room air (RA), the period of time during which the air supply fan (13) is at rest in the intermittent operating cycle increases.

As the temperature (To) of the outdoor air (OA) decreases, the effect of cooling the total heat exchanger (15) by the outdoor air (OA) is enhanced. As a result, freezing of the total heat exchanger (15) more easily progresses. Thus, in the second aspect, the air supply fan (13) is intermittently stopped in response to the index of the moisture content in the room air (RA) and the temperature (To) of the outdoor air (OA).

A third aspect of the disclosure is an embodiment of the ventilation device of the first or second aspect. In this embodiment, the ventilation device may further include: an air exhaust fan (14) configured to transfer air from an inside of the room to the outside of the room through the air exhaust passage (12). The controller (60) may drive the air exhaust fan (14) in the intermittent operating cycle in which the air supply fan (13) is intermittently stopped.

The third aspect may prevent low-temperature outdoor air (OA) from flowing into the total heat exchanger (15), and allows relatively high-temperature room air (RA) to flow into the total heat exchanger (15), during the period of time during which the air supply fan (13) is at rest. Thus, the relatively high-temperature room air (RA) may heat the total heat exchanger (15).

A fourth aspect of the disclosure is an embodiment of the ventilation device of the third aspect. In this embodiment, if the temperature (To) of the outdoor air (OA) is below a lower temperature limit (TL) lower than the predetermined lower temperature threshold (Tth), the controller (60) may continuously stop the air supply fan (13) and the air exhaust fan (14).

The fourth aspect may prevent the outdoor air (OA) and the room air (RA) from flowing into the total heat exchanger (15) in a situation where even by intermittently stopping the air supply fan (13), the degree to which freezing of the total heat exchanger (15) progresses cannot be reduced because the temperature (To) of the outdoor air (OA) is excessively low.

A fifth aspect of the disclosure is an embodiment of the ventilation device of the third or fourth aspect. In this embodiment, if, at each of stages of the temperature (To) of the outdoor air (OA), the index of the moisture content in the room air (RA) is above a predetermined upper humidity limit (RL) corresponding to the stage of the temperature (To) of the outdoor air (OA), the controller (60) may continuously stop the air supply fan (13) and the air exhaust fan (14), and as the stage of temperature (To) of the outdoor air (OA) shifts toward lower stages, the upper humidity limit (RL) associated with the stage of the temperature (To) of the outdoor air (OA) may decrease.

The fifth aspect may prevent the outdoor air (OA) and the room air (RA) from flowing into the total heat exchanger (15) in a situation where even by intermittently stopping the air supply fan (13), the degree to which freezing of the total heat exchanger (15) progresses cannot be reduced because the moisture content in the room air (RA) is excessively high.

A sixth aspect of the disclosure is an embodiment of the ventilation device of any one of the first through fifth aspects. In this embodiment, the index of the moisture content in the room air (RA) may be an absolute humidity (Rzr) of the room air (RA).

In the sixth aspect, the absolute humidity (Rzr) of the room air (RA) is an index indicating the ratio of the weight of moisture in the air to the weight of dry air. Thus, the amount of condensation may be more easily managed than if the dew point, which indicates the temperature at which condensation starts as a result of cooling the air, is detected as the index of the moisture content in the room air (RA). This allows the relation between the stage of the index of the moisture content in the room air (RA) and the period of time during which the air supply fan (13) is at rest in the intermittent operating cycle to be appropriately determined.

Advantages of the Invention

According to the first aspect of the disclosure, the degree of cooling of a total heat exchanger (15) by low-temperature outdoor air (OA) may be reduced, thereby reducing the degree to which freezing of the total heat exchanger (15) progresses. In addition, an air supply fan (13) may be controlled in response to the index of the moisture content in room air (RA) such that as the stage of the index of the moisture content in the room air (RA) shifts toward higher stages, the period of time during which the air supply fan (13) is at rest in an intermittent operating cycle increases. This may effectively reduce both the degree to which freezing of the total heat exchanger (15) progresses and the degree to which the ventilation air volume decreases.

According to the second aspect of the disclosure, the air supply fan (13) is intermittently stopped in response to the index of the moisture content in the room air (RA) and the outdoor temperature (To). This may effectively reduce both the degree to which freezing of the total heat exchanger (15) progresses and the degree to which the ventilation air volume decreases.

According to the third aspect of the disclosure, relatively high-temperature room air (RA) may heat the total heat exchanger (15). This may reduce the degree of freezing of the total heat exchanger (15).

According to the fourth aspect of the disclosure, the outdoor air (OA) and the room air (RA) may be prevented from flowing into the total heat exchanger (15) in a situation where even by intermittently stopping the air supply fan (13), the degree to which freezing of the total heat exchanger (15) progresses cannot be reduced because the outdoor temperature (To) is excessively low. This may reliably prevent freezing of the total heat exchanger (15) from progressing.

According to the fifth aspect of the disclosure, the outdoor air (OA) and the room air (RA) may be prevented from flowing into the total heat exchanger (15) in a situation where even by intermittently stopping the air supply fan (13), the degree to which freezing of the total heat exchanger (15) progresses cannot be reduced because the moisture content in the room air (RA) is excessively high. This may reliably prevent freezing of the total heat exchanger (15) from progressing.

According to the sixth aspect of the disclosure, the relation between the stage of the index of the moisture content in the room air (RA) and the period of time during which the air supply fan (13) is stopped in the intermittent operating cycle may be appropriately determined. This may appropriately reduce both the degree to which freezing of the total heat exchanger (15) progresses and the degree to which the ventilation air volume decreases.

BRIEF DESCRIPTION OF THE DRAWINGS

FIG. 7 is a flow chart for explaining a fan control operation of a ventilation controller.

DESCRIPTION OF EMBODIMENTS

Figure 1:
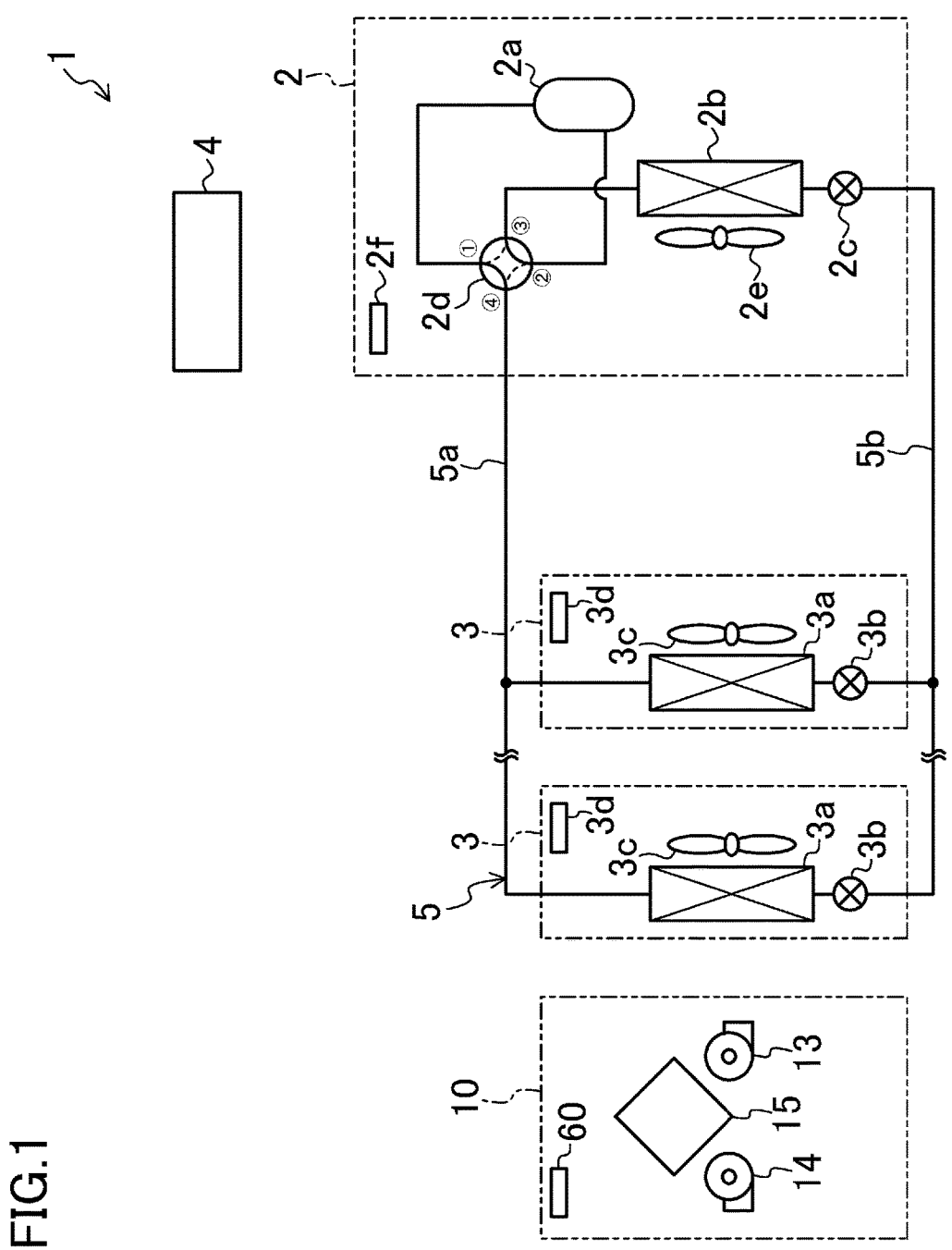
FIG. 1 is a piping system diagram showing an exemplary configuration for an air conditioner.

Embodiments will now be described in detail with reference to the drawings. Note that like reference characters denote the same or equivalent components in the drawings, and the description thereof will not be repeated.

[Air Conditioner]

FIG. 1 illustrates an exemplary configuration for an air conditioner (I) according to an embodiment. This air conditioner (1) conditions the air in a room and ventilates the room, and comprises a so-called multiple air conditioner system for buildings. More specifically, the air conditioner (1) includes an outdoor unit (2) arranged outside the room, a plurality of indoor units (3) and a ventilation device (10) arranged inside the room, and a controller (4) manipulated by an operator. In this air conditioner (1), two refrigerant pipes (a gas communication pipe (5a) and a liquid communication pipe (5b)) are connected to the outdoor unit (2), and the plurality of indoor units (3) are connected in parallel to the two refrigerant pipes (5a, 5b). This configuration provides a refrigerant circuit (5) in which a refrigerant is circulated to perform a vapor compression refrigeration cycle.

<Outdoor Unit>

The outdoor unit (2) includes a compressor (2a), an outdoor heat exchanger (2b), an outdoor expansion valve (2c), a four-way switching valve (2d), an outdoor fan (2e), and an outdoor controller (2f). The four-way switching valve (2d) has a first port connected to a discharge end of the compressor (2a), a second port connected to a suction end of the compressor (2a), a third port connected to a gas end of the outdoor heat exchanger (2b), and a fourth port connected to the gas communication pipe (5a). Further, the four-way switching valve (2d) is switchable between a first state (indicated by solid curves in FIG. 1) in which the first and fourth ports communicate with each other and the second and third ports communicate with each other, and a second state (indicated by broken curves in FIG. 1) in which the first and third ports communicate with each other and the second and fourth ports communicate with each other. The outdoor heat exchanger (2b) has a liquid end connected to the liquid communication pipe (5b) through the outdoor expansion valve (2c). The outdoor controller (20 is configured to be able to communicate with the controller (4), and controls the compressor (2a), the outdoor expansion valve (2c), the four-way switching valve (2d), and the outdoor fan (2e).

<Indoor Unit>

Each of the indoor units (3) includes an indoor heat exchanger (3a), an indoor expansion valve (3b), an indoor fan (3c), and an indoor controller (3d). The indoor heat exchanger (3a) has a liquid end connected to the liquid communication pipe (5b) through the indoor expansion valve (3b), and a gas end connected to the gas communication pipe (5a). The indoor controller (3d) is configured to be able to communicate with the controller (4), and controls the indoor expansion valve (3b) and the indoor fan (3c).

<Ventilation Device>

The ventilation device (10) includes an air supply fan (13), an air exhaust fan (14), a total heat exchanger (15), and a ventilation controller (60). The ventilation controller (60) is configured to be able to communicate with the controller (4), and controls the air supply fan (13) and the air exhaust fan (14). The configuration for the ventilation device (10) will be described in detail later.

<Controller>

The controller (4) is configured to be able to communicate with the outdoor controller (20, the indoor controller (3d), and the ventilation controller (60), and transmits and receives control signals for conditioning the air in the room and ventilating the room in response to the manipulation by an operator (e.g., selection of an operation mode and input of set temperature).

<Operation Mechanism of Air Conditioner>

As described above, in the air conditioner (1), the compressor (2a), the outdoor heat exchanger (2b), the outdoor expansion valve (2c), the four-way switching valve (2d), each indoor heat exchanger (3a), and each indoor expansion valve (3b) are connected to comprise the refrigerant circuit (5). This air conditioner (1) performs a heating operation and a cooling operation. In this example, all the indoor units (3) perform the same air conditioning operation (the heating or cooling operation). That is, the air conditioner (1) comprises a cooling/heating switching device in which all the indoor units (3) perform the heating or cooling operation.

<<Heating Operation>>

During the heating operation, the four-way switching valve (2d) is set to be in the first state, the degree of opening of the outdoor expansion valve (2c) is adjusted to reduce the pressure of a liquid refrigerant to a predetermined pressure, the indoor expansion valve (3b) in each of the indoor units (3) is adjusted to open to a predetermined degree, and the compressor (2a) and the outdoor and indoor fans (2e, 3c) are driven. Thus, the refrigerant circuit (5) performs a refrigeration cycle in which the indoor heat exchanger (3a) in each of the indoor units (3) functions as a condenser, and the outdoor heat exchanger (2b) functions as an evaporator. The room is heated in this manner.

<<Cooling Operation>>

During the cooling operation, the four-way switching valve (2d) is set to be in the second state, the outdoor expansion valve (2c) is set to full-open, the indoor expansion valve (3b) in each of the indoor units (3) is set to open to a predetermined degree, and the compressor (2a) and the outdoor and indoor fans (2e, 3c) are driven. Thus, the refrigerant circuit (5) performs a refrigeration cycle in which the outdoor heat exchanger (2b) functions as a condenser, and the indoor heat exchanger (3a) in each of the indoor units (3) functions as an evaporator. The room is cooled in this manner.

<Configuration for Ventilation Device>

Figure 2:
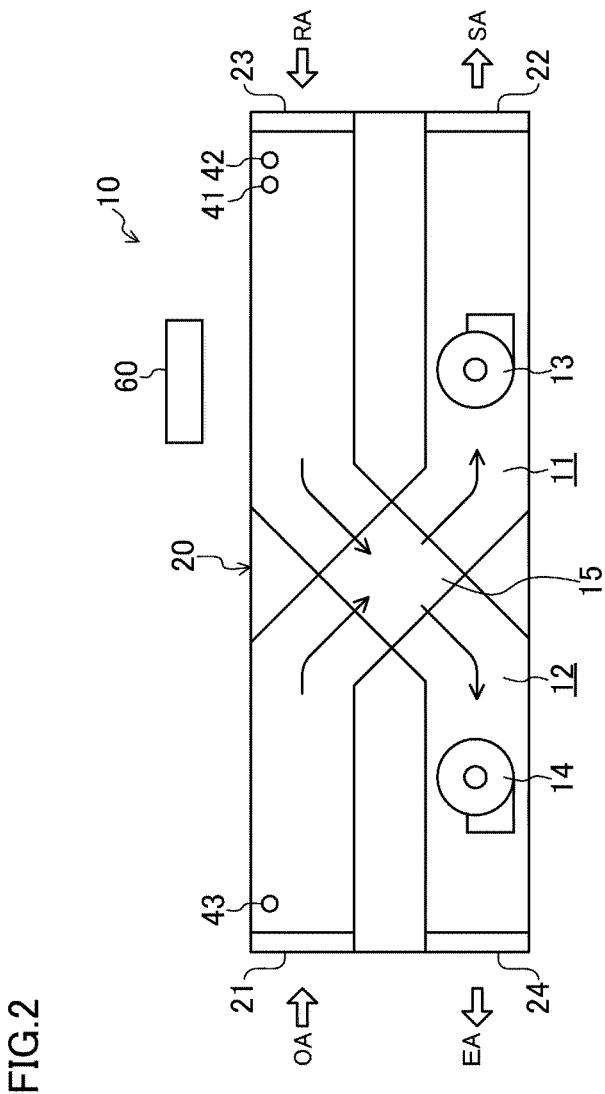
FIG. 2 is a schematic view showing an exemplary configuration for a ventilation device.

As shown in FIG. 2, the ventilation device (10) includes a casing (20) having an air supply passage (11) and an air exhaust passage (12), the air supply fan (13), the air exhaust fan (14), the total heat exchanger (15), a room temperature sensor (41), a room humidity sensor (42), an outdoor temperature sensor (43), and the ventilation controller (60).

<<Casing>>

The casing (20) is in the shape of a rectangular parallelepiped box, and houses the air supply fan (13), the air exhaust fan (14), and the total heat exchanger (15) therein. The casing (20) has an outdoor-air inlet (21), an air supply opening (22), a room-air inlet (23), and an exhaust opening (24). The casing (20) has the outdoor-air inlet (21) and the exhaust opening (24) facing outdoors, and the air supply opening (22) and the room-air inlet (23) facing indoors.

The air supply passage (11) is an air passage for supplying outdoor air (OA) into the room, communicates with the outside of the room through the outdoor-air inlet (21) facing outdoors, and communicates with the inside of the room through the air supply opening (22) facing indoors. In this manner, the air supply passage (11) allows the outdoor-air inlet (21) to communicate with the air supply opening (22). Outdoor air (OA) that has passed through the air supply passage (11) is supplied into the room as supply air (SA).

The air exhaust passage (12) is an air passage for exhausting room air (RA) to outside the room, communicates with the inside of the room through the room-air inlet (23) facing indoors, and communicates with the outside of the room through the exhaust opening (24) facing outdoors. In this manner, the air exhaust passage (12) allows the room-air inlet (23) to communicate with the exhaust opening (24). Room air (RA) that has passed through the air exhaust passage (12) is exhausted to outside the room as exhaust air (EA).

In the casing (20), the air supply passage (11) and the air exhaust passage (12) are formed to intersect with each other in the total heat exchanger (15).

<<Air Supply Fan, Air Exhaust Fan>>

The air supply fan (13) transfers the air from the outside of the room into the room through the air supply passage (11). In this example, in the air supply passage (11), the air supply fan (13) is provided to be closer to the inside of the room than the total heat exchanger (15) is (i.e., downstream of the total heat exchanger (15)).

The air exhaust fan (14) transfers the air from the inside of the room to the outside of the room through the air exhaust passage (12). In this example, in the air exhaust passage (12), the exhaust fan (14) is provided to be closer to the outside of the room than the total heat exchanger (15) is (i.e., downstream of the total heat exchanger (15)).

<<Total Heat Exchanger>>

The total heat exchanger (15) allows total heat exchange to occur between the air flowing through the air supply passage (11) and the air flowing through the air exhaust passage (12). In other words, the total heat exchanger (15) exchanges heat (sensible heat and latent heat) between the air in the air supply passage (11) and the air in the air exhaust passage (12).

Figure 3:
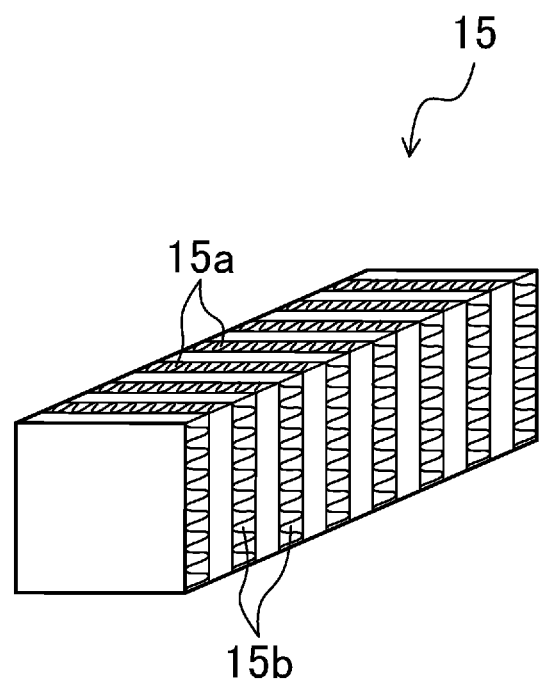
FIG. 3 is a perspective view showing an exemplary configuration for a total heat exchanger.

For example, as shown in FIG. 3, the total heat exchanger (15) is in the shape of a quadrangular prism. The total heat exchanger (15) includes flat members and corrugated members stacked alternately so as to form air supply channels (15a) through which the air in the air supply passage (11) flows on one of adjacent side surfaces of the total heat exchanger (15), and exhaust channels (15b) through which the air in the air exhaust passage (12) flows on the other one of the adjacent side surfaces. The flat members and the corrugated members are made of a vapor permeable material (e.g., paper), and moisture is movable between the air in the air supply channels (15a) and the air in the exhaust channels (15b). Thus, the total heat exchanger (15) is able to exchange not only sensible heat, but also latent heat.

Moreover, the total heat exchanger (15) is arranged such that its side surface on which the air supply channels (15a) are opened faces the air supply passage (11), and its side surface on which the exhaust channels (15b) are opened faces the air exhaust passage (12). In other words, the total heat exchanger (15) constitutes a crossflow heat exchanger in which the extending direction of the air supply channels (15a) is orthogonal to the extending direction of the exhaust channels (15b).

<<Various Sensors>>

The room temperature sensor (41) detects the temperature (Tr) of the room air (RA). In this example, the room temperature sensor (41) is arranged in the air exhaust passage (12) to be closer to the inside of the room than the total heat exchanger (15) is (i.e., upstream of the total heat exchanger (15)), and detects the temperature of the air at its installation site as the temperature (Tr) of the room air (RA).

The room humidity sensor (42) detects the relative humidity (Rr) of the room air (RA). In this example, the room humidity sensor (42) is arranged in the air exhaust passage (12) to be closer to the inside of the room than the total heat exchanger (15) is (i.e., upstream of the total heat exchanger (15)), and detects the relative humidity of the air at its installation site as the relative humidity (Rr) of the room air (RA).

The outdoor temperature sensor (43) detects the temperature (To) of the outdoor air (OA). In this example, the outdoor temperature sensor (43) is arranged in the air supply passage (11) to be closer to the outside of the room than the total heat exchanger (15) is (i.e., upstream of the total heat exchanger (15)), and detects the temperature of the air at its installation site as the temperature (To) of the outdoor air (OA).

<<Ventilation Controller (Controller)>>

The ventilation controller (60) controls the air supply fan (13) and the air exhaust fan (14) to control a ventilation operation of the ventilation device (10). Specifically, the ventilation controller (60) controls the air supply fan (13) and the air exhaust fan (14) based on the values detected by the room temperature sensor (41), the room humidity sensor (42), and the outdoor temperature sensor (43). For example, the ventilation controller (60) is comprised of a CPU, a memory, or any other component.

<Fan Control>

Next, control of the air supply fan (13) and the air exhaust fan (14) during the ventilation operation will be described with reference to FIGS. 4, 5, and 6. The ventilation controller (60) performs a moisture content index detection process, an outdoor temperature level detection process, a room humidity level detection process, and a fan control instruction process every predetermined operating cycle (e.g., 60 minutes). Note that in the following description, the temperature (Tr) of room air (RA) is referred to as the "room temperature (Tr)," the relative humidity (Rr) of the room air (RA) is referred to as the "room relative humidity (Rr)," the absolute humidity (Rzr) of the room air (RA) is referred to as the "room absolute humidity (Rzr)," and the temperature (To) of outdoor air (OA) is referred to as the "outdoor temperature (To)."

<<Moisture Content Index Detection Process>>

First, the ventilation controller (60) detects an index of the moisture content in the room air (RA) based on the value detected by the room temperature sensor (41) (the room temperature (Tr)) and the value detected by the room humidity sensor (42) (the room relative humidity (Rr)). The index of the moisture content index in the room air (RA) denotes an index that depends on the moisture content in the room air (RA). As the moisture content in the room air (RA) increases, the index of the moisture content in the room air (RA) increases. In this example, the ventilation controller (60) detects the room absolute humidity (Rzr) as the index of the moisture content in the room air (RA).

<<Outdoor Temperature Level Detection Process>>

Figure 4:
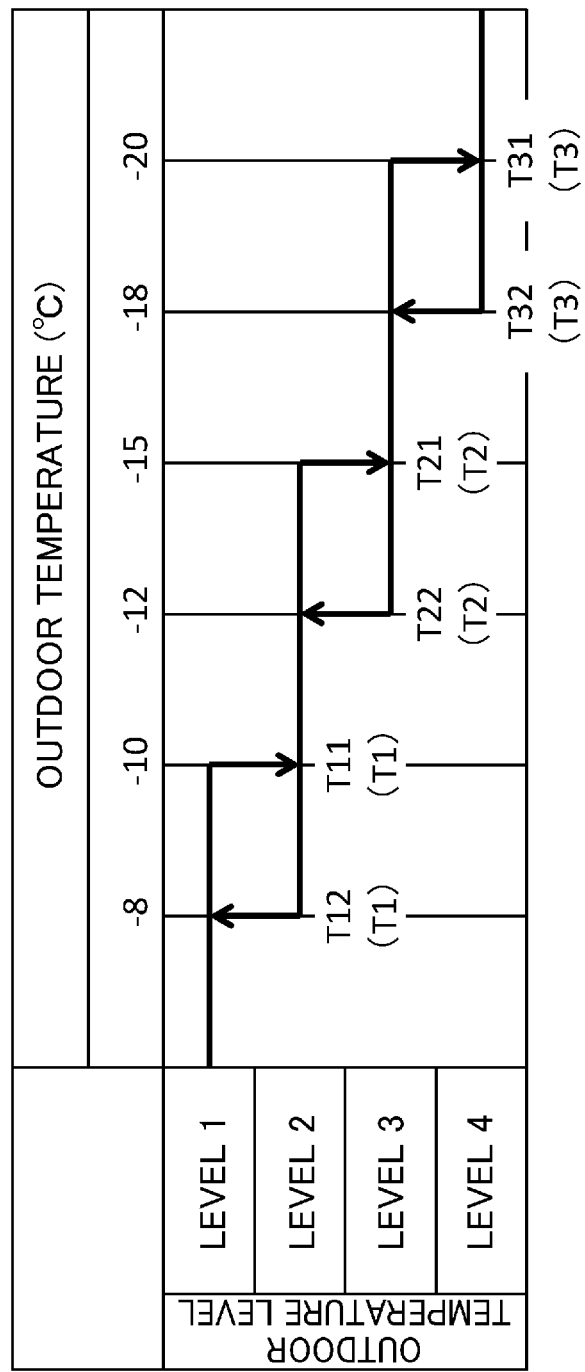
FIG. 4 explains an outdoor temperature level detection process.

Next, as shown in FIG. 4, the ventilation controller (60) determines, from a plurality of outdoor temperature levels (in this example, four levels, i.e., Levels 1 to 4), one level corresponding to the outdoor temperature (To), based on the value detected by the outdoor temperature sensor (43) (the outdoor temperature (To)). Note that in this example, as the stage of the outdoor temperature (To) shifts toward lower temperature stages, the outdoor temperature level ascends in a stepwise manner from "Level 1" to "Level 4."

Specifically, in this example, in the ventilation controller (60), four outdoor temperature levels defined by three temperature thresholds (first, second, and third temperature thresholds (T1, T2, T3) are determined. The second temperature threshold (T2) is lower than the first temperature threshold (T1), and the third temperature threshold (T3) is lower than the second temperature threshold (T2). In other words, among the outdoor temperature levels, "Level 1," "Level 2," "Level 3," and "Level 4" respectively correspond to the "range of temperatures higher than or equal to the first temperature threshold (T1)," the "range of temperatures between the first and second temperature thresholds (T1, T2)," and the "range of temperatures between the second and third temperature thresholds (T2, T3)," and the "range of temperatures lower than the third temperature threshold (T3)."

In this example, if the current value of the outdoor temperature (To) is lower than the previous value thereof, the temperature thresholds (T1, T2, T3) are respectively set to be lower temperature thresholds (T11, T21, T31). If the current value of the outdoor temperature (To) is higher than or equal to the previous value, the temperature thresholds (T1, T2, T3) are respectively set to be higher temperature thresholds (T12, T22, T32). The lower temperature thresholds (T11, T21, T31) are each lower than an associated one of the higher temperature thresholds (T12, T22, T32). In FIG. 4, the lower temperature thresholds (T11, T21, T31) are respectively set to be −10° C., −15° C., and −20° C., and the higher temperature thresholds (T12, T22, T32) are respectively set to be −8° C., −12° C., and −18° C.

For example, if the outdoor temperature (To) decreases from "−7° C." to "−11° C.," the ventilation controller (60) sets the temperature thresholds (T1, T2, T3) to be the lower temperature thresholds (T11, T21, T31), respectively. Thus, the temperature range corresponding to "Level 2" of the outdoor temperature levels is the range of temperatures between −10° C. (=T11) and −15° C. (=T21). Then, the ventilation controller (60) changes the outdoor temperature level from "Level 1" corresponding to the previous value (−7° C.) of the outdoor temperature (To) to "Level 2" corresponding to the current value (−11° C.) of the outdoor temperature (To).

<<Room Humidity Level Detection Process>>

Figure 5:
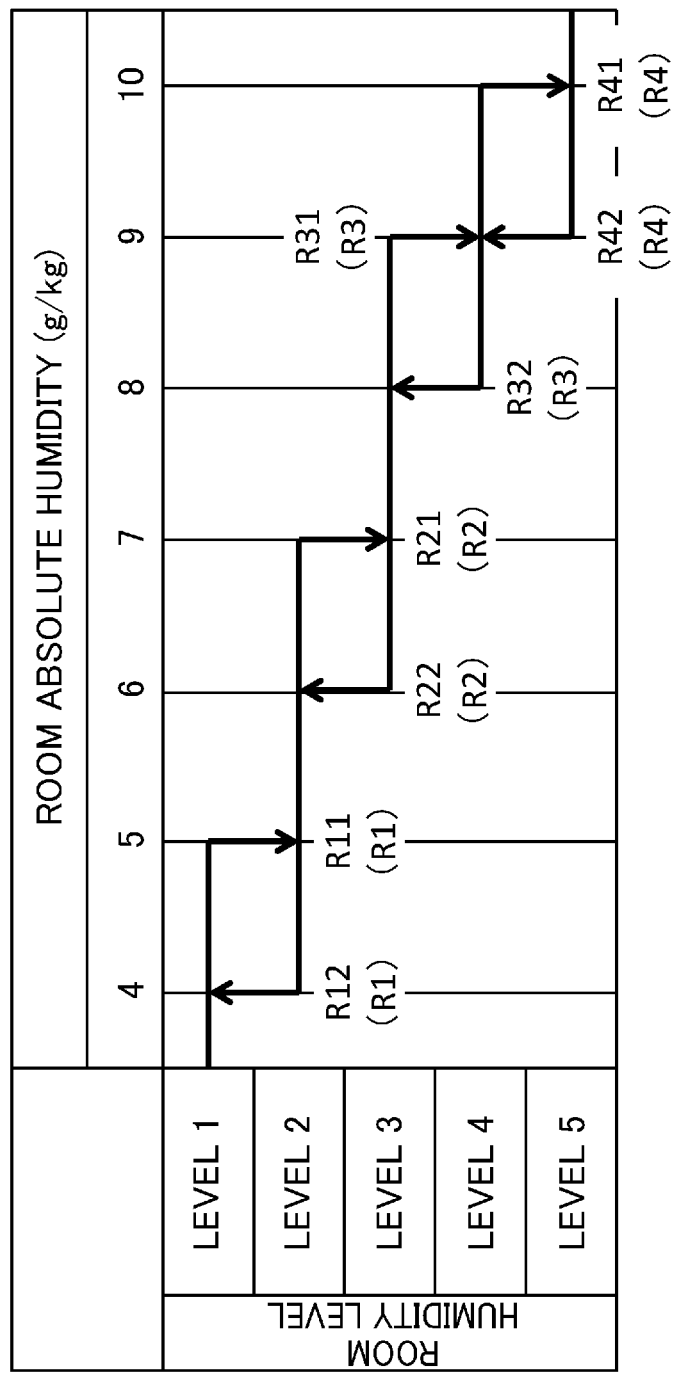
FIG. 5 explains a room humidity level detection process.

Next, as shown in FIG. 5, the ventilation controller (60) determines, based on the room absolute humidity (Rzr) detected by the moisture content index detection process, one of a plurality of room humidity levels (in this example, five levels, i.e., Levels 1 to 5) corresponding to the room absolute humidity (Rzr). Note that in this example, as the stage of the room absolute humidity (Rzr) shifts toward higher humidity stages, the room humidity level ascends in a stepwise manner from "Level 1" to "Level 5."

Specifically, in this example, in the ventilation controller (60), five room humidity levels defined by four humidity thresholds (first, second, third, and fourth humidity thresholds (R1, R2, R3, R4)) are determined. The second humidity threshold (R2) is higher than the first humidity threshold (R1), the third humidity threshold (R3) is higher than the second humidity threshold (R2), and the fourth humidity threshold (R4) is higher than the third humidity threshold (R3). In other words, among the outdoor temperature levels, "Level 1," "Level 2," "Level 3," "Level 4," and "Level 5" respectively correspond to the "range of humidities lower than or equal to the first humidity threshold (R1)," the "range of humidities between the first and second thresholds (R1, R2)," the "range of humidities between the second and third humidity thresholds (R2, R3)," the "range of humidities between the third and fourth humidity thresholds (R3, R4)," and the "range of humidities higher than the fourth humidity threshold (R4)."

In this example, if the current value of the room absolute humidity (Rzr) is higher than the previous value thereof, the humidity thresholds (R1, R2, R3, R4) are respectively set to be higher humidity thresholds (R11, R21, R31, R41). If the current value of the room absolute humidity (Rzr) is lower than or equal to the previous value, the humidity thresholds (R1, R2, R3, R4) are respectively set to be lower humidity thresholds (R12, R22, R32, R42). The higher humidity thresholds (R11, R21, R31, R41) are each higher than an associated one of the lower humidity thresholds (R12, R22, R32, R42). In FIG. 5, the higher humidity thresholds (R11, R21, R31, R41) are respectively set to be 5 g/kg, 7 g/kg, 9 g/kg, and 10 g/kg, and the lower humidity thresholds (R12, R22, R32, R42) are respectively set to be 4 g/kg, 6 g/kg, 8 g/kg, and 9 g/kg.

For example, if the room absolute humidity (Rzr) increases from "3.5 g/kg" to "5.5 g/kg," the ventilation controller (60) sets the humidity thresholds (R1, R2, R3, R4) to be the higher humidity thresholds (R11, R21, R31, R41), respectively. Thus, the humidity range corresponding to "Level 2" of the room humidity levels is the range of humidities between 5 g/kg (=RH) and 7 g/kg (=R21). Then, the ventilation controller (60) changes the room humidity level from "Level 1" corresponding to the previous value (3.5 g/kg) of the room absolute humidity (Rzr) to "Level 2" corresponding to the current value (5.5 g/kg) of the room absolute humidity (Rzr).

<<Fan Control Instruction Process>>

Next, the ventilation controller (60) selects, from fan control instructions that have been registered in a fan control table (FIG. 6), one fan control instruction which corresponds to the outdoor temperature level detected by the outdoor temperature level detection process and the room humidity level detected by the room humidity level detection process. The ventilation controller (60) controls the air supply fan (13) and the air exhaust fan (14) based on the selected fan control instruction.

Figure 6:
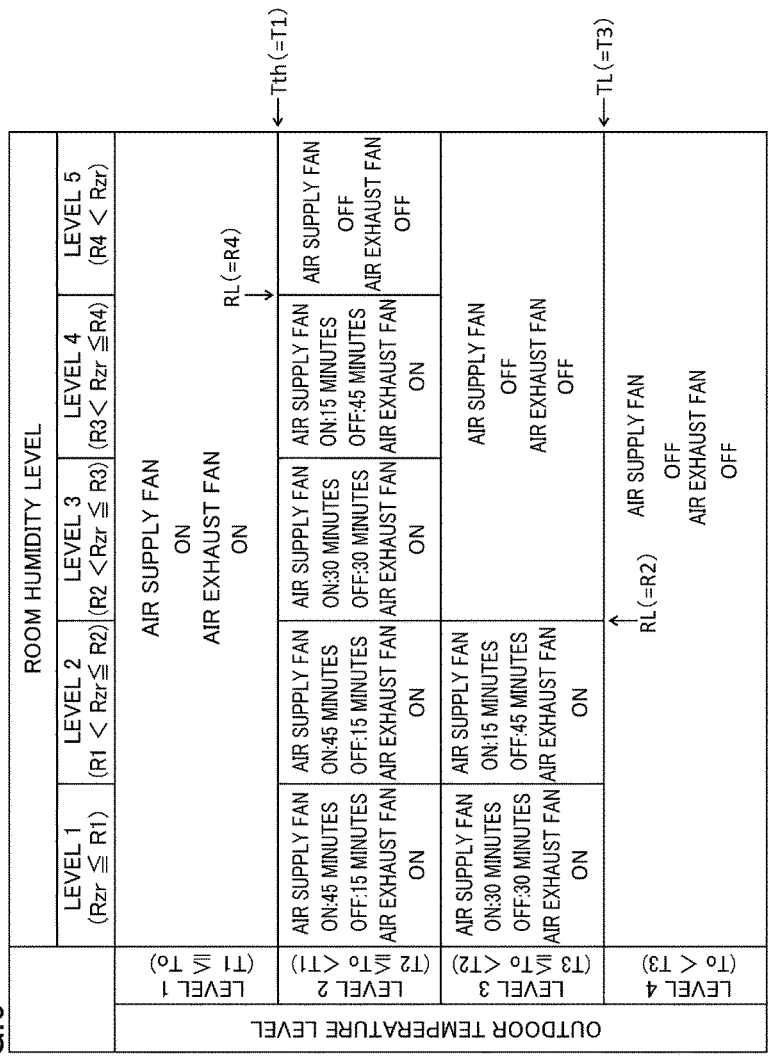
FIG. 6 shows an example of a fan control table.

As shown in FIG. 6, in the fan control table, the fan control instructions are each associated with one of the outdoor temperature levels and one of the room humidity levels. The fan control instructions indicate the operating mode of the air supply fan (13) and the air exhaust fan (14). In FIG. 6, each fan control instruction indicates any one of an intermittent air supply operating mode, a normal operating mode, and a shutdown mode.

—Intermittent Air Supply Operating Mode—

The intermittent air supply operating mode is an operating mode in which while the air supply fan (13) is intermittently stopped, the air exhaust fan (14) is continuously driven. The fan control instructions indicating the intermittent air supply operating mode indicate the period of time during which the air supply fan (13) is at rest in an intermittent operating cycle. For example, a combination of "Level 2" of the outdoor temperature levels and "Level 1" of the room humidity levels is associated with the fan control instruction indicating the intermittent air supply operating mode. In this intermittent air supply operating mode, "the air supply fan (13) performs an intermittent operation in which it is driven for 45 minutes and is at rest for 15 minutes (i.e., an intermittent operation in which it is at rest for 15 minutes in a 60-minute intermittent operating cycle), and the air exhaust fan (14) performs a normal operation (specifically, continuous driving for 60 minutes)."

—Normal Operating Mode—

The normal operating mode is an operating mode in which the air supply fan (13) and the air exhaust fan (14) are both continuously driven. For example, a combination of "Level 1" of the outdoor temperature levels and "Level 1" of the room humidity levels is associated with the fan control instruction indicating the normal operating mode. In this normal operating mode, "the air supply fan (13) and the air exhaust fan (14) both perform a normal operation (specifically, continuous driving for 60 minutes)."

—Shutdown Mode—

The shutdown mode is an operating mode in which the air supply fan (13) and the air exhaust fan (14) are both continuously at rest. For example, a combination of "Level 4" of the outdoor temperature levels and "Level 1" of the room humidity levels is associated with the fan control instruction indicating the shutdown mode. In this shutdown mode, "the air supply fan (13) and the air exhaust fan (14) both perform a shutdown operation (specifically, continuous shutdown for 60 minutes)."

—Arrangement of Fan Control Instructions—

In the fan control table shown in FIG. 6, the five fan control instructions associated with "Level 1" of the outdoor temperature levels indicate the normal operating mode. In other words, if the outdoor temperature level is "Level 1," the operating mode of the air supply fan (13) and the air exhaust fan (14) is set to be the normal operating mode.

Among the five fan control instructions associated with "Level 2" of the outdoor temperature levels, the four fan control instructions respectively associated with "Level 1," "Level 2," "Level 3," and "Level 4" of the room humidity levels indicate the intermittent air supply operating mode. In these four fan control instructions, as the room humidity level ascends from "Level 2" to "Level 3," and then to "Level 4," the period of time during which the air supply fan (13) is at rest in the intermittent operating cycle increases from "15 minutes" to "30 minutes," and then to "45 minutes." In other words, if the outdoor temperature level is "Level 2," the period of time during which the air supply fan (13) is at rest in the intermittent operating cycle increases as the room humidity level ascends.

Among the five fan control instructions associated with "Level 2" of the outdoor temperature levels, one fan control instruction associated with "Level 5" of the room humidity levels indicates the shutdown mode. In other words, if the outdoor temperature level is "Level 2," and the room humidity level is "Level 5 (high humidity level)," the operating mode of the air supply fan (13) and the air exhaust fan (14) is set to be the shutdown mode.

Among the five fan control instructions associated with "Level 3" of the outdoor temperature levels, two fan control instructions associated with "Level 1" and "Level 2" of the room humidity levels indicate the intermittent air supply operating mode. According to these two fan control instructions, if the room humidity level ascends from "Level 1" to "Level 2," the period of time during which the air supply fan (13) is at rest in the intermittent operating cycle increases from "30 minutes" to "45 minutes." In other words, if the outdoor temperature level is "Level 3," the period of time during which the air supply fan (13) is at rest in the intermittent operating cycle increases as the room humidity level ascends.

Among the five fan control instructions associated with "Level 3" of the outdoor temperature levels, three fan control instructions associated with "Level 3," "Level 4," and "Level 5" of the room humidity levels indicate the shutdown mode. In other words, if the outdoor temperature level is "Level 3," and the room humidity level is higher than or equal to "Level 3 (high humidity level)," the operating mode of the air supply fan (13) and the air exhaust fan (14) are set to be the shutdown mode.

The five fan control instructions associated with "Level 4" of the outdoor temperature levels indicate the shutdown mode. In other words, if the outdoor temperature level is "Level 4," the operating mode of the air supply fan (13) and the air exhaust fan (14) is set to be the shutdown mode.

According to two fan control instructions associated with "Level 2" and "Level 3" of the outdoor temperature levels (the fan control instructions indicating the intermittent air supply operating mode) among the four fan control instructions associated with "Level 1" of the room humidity levels, as the outdoor temperature level ascends to "Level 2" and then to "Level 3," the period of time during which the air supply fan (13) is at rest in the intermittent operating cycle increases to "15 minutes" and then to "30 minutes." In other words, if the room humidity level is "Level 1," the period of time during which the air supply fan (13) is at rest in the intermittent operating cycle increases as the outdoor temperature level ascends.

Among the four fan control instructions associated with "Level 2" of the room humidity levels, two fan control instructions associated with "Level 2" and "Level 3" of the outdoor temperature levels (the fan control instructions indicating the intermittent air supply operating mode) show that as the outdoor temperature level ascends to "Level 2" and then to "Level 3," the period of time during which the air supply fan (13) is at rest in the intermittent operating cycle increases to "15 minutes" and then to "45 minutes." In other words, if the room humidity level is "Level 2," the period of time during which the air supply fan (13) is at rest in the intermittent operating cycle increases as the outdoor temperature level ascends.

<Operation of Ventilation Controller>

Next, operation of the ventilation controller (60) based on the fan control table shown in FIG. 6 will be described with reference to FIG. 7. The ventilation controller (60) performs processes indicated below (fan control operation) every predetermined operating cycle (in this example, 60 minutes).

<<Steps (ST11, ST12)>>

First, the ventilation controller (60) acquires the value detected by the room temperature sensor (41) (the room temperature (Tr)), the value detected by the room humidity sensor (42) (the room relative humidity (Rr)), and the value detected by the outdoor temperature sensor (43) (the outdoor temperature (To)), and performs the moisture content index detection process (step (ST11)). Thus, the room absolute humidity (Rzr) is detected. Next, the ventilation controller (60) performs the outdoor temperature level detection process and the room humidity level detection process (step (ST12)). Thus, the outdoor temperature level and the room humidity level are detected.

<<Step (ST13)>>

Next, if the outdoor temperature level is higher than or equal to "Level 2," the ventilation controller (60) sets the operating mode of the air supply fan (13) and the air exhaust fan (14) to be the intermittent air supply operating mode (step (ST16)) or the shutdown mode (step (ST17)). On the other hand, if the outdoor temperature level is "Level 1," the ventilation controller (60) sets the operating mode of the air supply fan (13) and the air exhaust fan (14) to be the normal operating mode (step (ST18)).

In this case, if the temperature threshold corresponding to the border between "Level 1" and "Level 2" of the outdoor temperature levels (the first temperature threshold (T1) shown in FIG. 6) is set to be the "lower temperature threshold (Tth)," it can be said that the ventilation controller (60) is configured as follows. Specifically, if the outdoor temperature (To) is below the predetermined lower temperature threshold (Tth), the ventilation controller (60) sets the operating mode of the air supply fan (13) and the air exhaust fan (14) to be the "intermittent air supply operating mode"

or the "shutdown mode," and if the outdoor temperature (To) is higher than or equal to the lower temperature threshold (Tth), the ventilation controller (60) sets the operating mode of the air supply fan (13) and the air exhaust fan (14) to be the "normal operating mode."

<<Step (ST14)>>

If the outdoor temperature level is "Level 4," the ventilation controller (60) sets the operating mode of the air supply fan (13) and the air exhaust fan (14) to be the shutdown mode (step (ST17)).

In this case, if the temperature threshold corresponding to the border between "Level 3" and "Level 4" of the outdoor temperature levels (the third temperature threshold (T3) shown in FIG. 6) is set to be the "lower temperature limit (TL)," it can be said that the ventilation controller (60) is configured as follows. Specifically, if the outdoor temperature (To) is below the predetermined lower temperature limit (TL), the ventilation controller (60) sets the operating mode of the air supply fan (13) and the air exhaust fan (14) to be the "shutdown mode."

<<Step (ST15)>>

If the outdoor temperature level is "Level 2," and the room humidity level is "Level 5 (high humidity level)," or if the outdoor temperature level is "Level 3," and the room humidity level is higher than or equal to "Level 3 (high humidity level)," the ventilation controller (60) sets the operating mode of the air supply fan (13) and the air exhaust fan (14) to be the shutdown mode (step (ST17)).

In this case, if the humidity threshold corresponding to the border between "Level 4" and "Level 5" of the room humidity levels (the fourth humidity threshold (R4) shown in FIG. 6) is set to be the "upper humidity limit (RL) corresponding to "Level 2" of the outdoor temperature levels," and the humidity threshold corresponding to the border between "Level 2" and "Level 3" of the room humidity levels (the second humidity threshold (R2) shown in FIG. 6) is set to be the "upper humidity limit (RL) corresponding to "Level 3" of the outdoor temperature levels," it can be said that the ventilation controller (60) is configured as follows. Specifically, if, at each stage of the outdoor temperature (To) (in FIG. 6, each of "Level 2" and "Level 3" of the outdoor temperature levels), the room absolute humidity (Rzr) is above a predetermined upper humidity limit (RL) corresponding to the stage of the outdoor temperature (To), the ventilation controller (60) sets the operating mode of the air supply fan (13) and the air exhaust fan (14) to be the "shutdown mode." Note that the upper humidity limit (RL) associated with each stage of the outdoor temperature (To) decreases as the stage of the outdoor temperature (To) shifts toward lower stages.

<<Step (ST16)>>

When setting the operating mode of the air supply fan (13) and the air exhaust fan (14) to be the "intermittent air supply operating mode," the ventilation controller (60) sets the period of time during which the air supply fan (13) is at rest in the intermittent operating cycle based on the fan control table. Specifically, the ventilation controller (60) intermittently stops the air supply fan (13) such that as the stage of the room absolute humidity (Rzr) shifts toward higher stages, the period of time during which the air supply fan (13) is at rest in the intermittent operating cycle increases. The ventilation controller (60) intermittently stops the air supply fan (13) such that as the stage of the outdoor temperature (To) shifts toward lower stages at each stage of the room absolute humidity (Rzr) (in FIG. 6, each of "Level 1" and "Level 2" of the room humidity levels), the period of time during which the air supply fan (13) is at rest in the intermittent operating cycle increases.

In the intermittent air supply operating mode, the ventilation controller (60) intermittently stops the air supply fan (13) while continuously driving the air exhaust fan (14). In other words, the ventilation controller (60) drives the air exhaust fan (14) in the intermittent operating cycle in which the air supply fan (13) is intermittently stopped.

<<Step (ST17)>>

In the shutdown mode, the ventilation controller (60) continuously stops both the air supply fan (13) and the air exhaust fan (14). If the operating mode of the air supply fan (13) and the air exhaust fan (14) is the shutdown mode, the ventilation controller (60) drives both the air supply fan (13) and the air exhaust fan (14) after a predetermined operating cycle (in this example, 60 minutes). Next, the ventilation controller (60) performs a subsequent fan control operation while continuing driving both the air supply fan (13) and the air exhaust fan (14). Such control allows detection by various sensors (the room temperature sensor (41), the room humidity sensor (42), and the outdoor temperature sensor (43)) in the subsequent fan control operation.

<<Step (ST18)>>

In the normal operating mode, the ventilation controller (60) continuously drives both the air supply fan (13) and the air exhaust fan (14). Thus, the room is ventilated.

Advantages of Embodiment

In the ventilation device (10) according to this embodiment, if the outdoor temperature (To) is below the lower temperature threshold (Tth), the ventilation controller (60) sets the operating mode of the air supply fan (13) and the air exhaust fan (14) to be an intermittent air supply operating mode, thereby intermittently stopping the air supply fan (13). This may reduce the flow rate of the outdoor air (OA) passing through the total heat exchanger (15), thereby reducing the degree of cooling of the total heat exchanger (15) by the low-temperature outdoor air (OA). This may reduce the degree to which freezing of the total heat exchanger (15) (specifically, freezing of condensed water in the total heat exchanger (15)) progresses. If the air supply fan (13) is intermittently stopped, the degree of decrease in the flow rate of the outdoor air (OA) transferred by the air supply fan (13) (i.e., decrease in ventilation air volume) may be lower than if the air supply fan (13) is continuously at rest.

The higher the moisture content in the room air (RA) is, the more easily condensation occurs in the total heat exchanger (15). As a result, freezing of the total heat exchanger (15) more easily progresses. In addition, the longer the period of time during which the air supply fan (13) is at rest in the intermittent operating cycle is, the lower the ventilation air volume is. Thus, in the intermittent air supply operating mode, the ventilation controller (60) controls the air supply fan (13) in response to the room absolute humidity (Rzr) such that as the stage of the index of the moisture content in the room air (RA) (in this example, the room absolute humidity (Rzr)) shifts toward higher stages, the period of time during which the air supply fan (13) is at rest in the intermittent operating cycle increases. This may effectively reduce both the degree to which freezing of the total heat exchanger (15) progresses and the degree to which the ventilation air volume decreases.

As the outdoor temperature (To) decreases, the effect of cooling the total heat exchanger (15) by the outdoor air (OA) is enhanced. As a result, freezing of the total heat exchanger (15) more easily progresses. Thus, in the intermittent air supply operating mode, the ventilation controller (60) intermittently stops the air supply fan (13) in response to the index of the moisture content in the room air (RA) (in this example, the room absolute humidity (Rzr)) and the outdoor temperature (To) such that as the stage of the outdoor temperature (To) shifts toward lower stages at each stage of the index of the moisture content in the room air (RA), the period of time during which the air supply fan (13) is at rest in the intermittent operating cycle increases. This may effectively reduce both the degree to which freezing of the total heat exchanger (15) progresses and the degree to which the ventilation air volume decreases.

In the intermittent air supply operating mode, the ventilation controller (60) drives the air exhaust fan (14) in the intermittent operating cycle in which the air supply fan (13) is intermittently stopped. This prevents low-temperature outdoor air (OA) from flowing into the total heat exchanger (15), and allows relatively high-temperature room air (RA) to flow into the total heat exchanger (15), during the period of time during which the air supply fan (13) is at rest. Thus, the relatively high-temperature room air (RA) may heat the total heat exchanger (15). This may reduce the degree of freezing of the total heat exchanger (15).

If the outdoor temperature (To) is below the lower temperature limit (TL) (a threshold lower than the lower temperature threshold (Tth)), the ventilation controller (60) continuously stops the air supply fan (13) and the air exhaust fan (14). This may prevent the outdoor air (OA) and the room air (RA) from flowing into the total heat exchanger (15) in a situation where even by intermittently stopping the air supply fan (13), the degree to which freezing of the total heat exchanger (15) progresses cannot be reduced because the outdoor temperature (To) is excessively low. This may reliably prevent freezing of the total heat exchanger (15) from progressing.

If, at each stage of the outdoor temperature (To), the index of the moisture content in the room air (RA) (in this example, the room absolute humidity (Rzr)) is above the predetermined upper humidity limit (RL) corresponding to the stage of the outdoor temperature (To), the ventilation controller (60) continuously stops the air supply fan (13) and the air exhaust fan (14). This may prevent the outdoor air (OA) and the room air (RA) from flowing into the total heat exchanger (15) in a situation where even by intermittently stopping the air supply fan (13), the degree to which freezing of the total heat exchanger (15) progresses cannot be reduced because the moisture content in the room air (RA) is excessively high. This may reliably prevent freezing of the total heat exchanger (15) from progressing.

The upper humidity limit (RL) associated with each stage of the outdoor temperature (To) decreases as the stage of the outdoor temperature (To) shifts toward lower stages. This may prevent the air supply fan (13) and the air exhaust fan (14) from being unnecessarily stopped. Thus, a sufficient ventilation air volume may be easily maintained.

The ventilation controller (60) detects the room absolute humidity (Rzr) as the index of the moisture content in the room air (RA). The room absolute humidity (Rzr) is an index indicating the ratio of the weight of moisture in the air to the weight of dry air. Thus, the amount of condensation may be more easily managed than if the dew point, which indicates the temperature at which condensation starts as a result of cooling the air, is detected as the index of the moisture content in the room air (RA). This allows the relation between the stage of the index of the moisture content in the room air (RA) and the period of time during which the air supply fan (13) is at rest in the intermittent operating cycle to be appropriately determined, and may appropriately reduce both the degree to which freezing of the total heat exchanger (15) progresses and the degree to which the ventilation air volume decreases.

Other Embodiments

In the foregoing description, an example in which the air conditioner (1) comprises a cooling/heating switching device in which all the indoor units (3) perform a heating or cooling operation. However, the air conditioner (1) may comprise a device for exclusive use as a heater, in which all the indoor units (3) perform only a heating operation, or a cooling/heating free device, in which the indoor units (3) individually perform a heating or cooling operation.

In addition, an example in which the room absolute humidity (Rzr) is detected as the index of the moisture content in the room air (RA) has been described, but the dew point may be detected as the index of the moisture content in the room air (RA).

The foregoing embodiments are merely preferred examples in nature, and are not intended to limit the scope, applications, or uses of the invention.

INDUSTRIAL APPLICABILITY

As can be seen from the foregoing description, the above-described ventilation device is useful as a ventilation device that ventilates a room.

DESCRIPTION OF REFERENCE CHARACTERS

1 Air Conditioner
2 Outdoor Unit
3 Indoor Unit
10 Ventilation Device
11 Air Supply Passage
12 Air Exhaust Passage
13 Air Supply Fan
14 Air Exhaust Fan
15 Total Heat Exchanger
20 Casing
21 Outdoor-Air Inlet
22 Air Supply Opening
23 Room-Air Inlet
24 Exhaust Opening
41 Room Temperature Sensor
42 Room Humidity Sensor
43 Outdoor Temperature Sensor
60 Ventilation Controller (Controller)

The invention claimed is:
1. A ventilation device comprising:
an air supply passage through which outdoor air (OA) is supplied into a room;
an air exhaust passage through which room air (RA) is exhausted to an outside of the room;
an air supply fan configured to transfer air from the outside of the room into the room through the air supply passage;
a total heat exchanger configured to allow total heat exchange to occur between air flowing through the air supply passage and air flowing through the air exhaust passage;
a room temperature sensor configured to detect a temperature (Tr) of the room air (RA);
a room humidity sensor configured to detect a relative humidity (Rr) of the room air (RA);

an outdoor temperature sensor configured to detect a temperature (To) of the outdoor air (OA); and a controller configured to detect an index of a moisture content that depends on the moisture content in the room air (RA) based on the temperature (Tr) and relative humidity (Rr) of the room air (RA) detected by the room temperature sensor and the room humidity sensor, and to, if the temperature (To) of the outdoor air (OA) detected by the outdoor temperature sensor is below a predetermined lower temperature threshold (Tth), intermittently stop the air supply fan in response to the index of the moisture content in the room air (RA) such that as a stage of the index of the moisture content in the room air (RA) shifts toward higher stages, a period of time during which the air supply fan is at rest in an intermittent operating cycle increases.

2. The ventilation device of claim 1, wherein
the controller intermittently stops the air supply fan in response to the index of the moisture content in the room air (RA) and the temperature (To) of the outdoor air (OA) such that as a stage of the temperature (To) of the outdoor air (OA) shifts toward lower stages at each of stages of the index of the moisture content in the room air (RA), the period of time during which the air supply fan is at rest in the intermittent operating cycle increases.

3. The ventilation device of claim 1, further comprising:
an air exhaust fan configured to transfer air from an inside of the room to the outside of the room through the air exhaust passage, wherein
the controller drives the air exhaust fan in the intermittent operating cycle in which the air supply fan is intermittently stopped.

4. The ventilation device of claim 3, wherein
if the temperature (To) of the outdoor air (OA) is below a predetermined lower temperature limit (TL) lower than the lower temperature threshold (Tth), the controller continuously stops the air supply fan and the air exhaust fan.

5. The ventilation device of claim 3, wherein
if, at each of stages of the temperature (To) of the outdoor air (OA), the index of the moisture content in the room air (RA) is above a predetermined upper humidity limit (RL) corresponding to the stage of the temperature (To) of the outdoor air (OA), the controller continuously stops the air supply fan and the air exhaust fan, and
as the stage of the temperature (To) of the outdoor air (OA) shifts toward lower stages, the upper humidity limit (RL) associated with the stage of the temperature (To) of the outdoor air (OA) decreases.

6. The ventilation device of claim 1, wherein
the index of the moisture content in the room air (RA) is an absolute humidity (Rzr) of the room air (RA).

7. The ventilation device of claim 2, further comprising:
an air exhaust fan configured to transfer air from an inside of the room to the outside of the room through the air exhaust passage, wherein
the controller drives the air exhaust fan in the intermittent operating cycle in which the air supply fan is intermittently stopped.

8. The ventilation device of claim 7, wherein
if the temperature (To) of the outdoor air (OA) is below a predetermined lower temperature limit (TL) lower than the lower temperature threshold (Tth), the controller continuously stops the air supply fan and the air exhaust fan.

9. The ventilation device of claim 7, wherein
if, at each of stages of the temperature (To) of the outdoor air (OA), the index of the moisture content in the room air (RA) is above a predetermined upper humidity limit (RL) corresponding to the stage of the temperature (To) of the outdoor air (OA), the controller continuously stops the air supply fan and the air exhaust fan, and
as the stage of the temperature (To) of the outdoor air (OA) shifts toward lower stages, the upper humidity limit (RL) associated with the stage of the temperature (To) of the outdoor air (OA) decreases.

10. The ventilation device of claim 8, wherein
if, at each of stages of the temperature (To) of the outdoor air (OA), the index of the moisture content in the room air (RA) is above a predetermined upper humidity limit (RL) corresponding to the stage of the temperature (To) of the outdoor air (OA), the controller continuously stops the air supply fan and the air exhaust fan, and
as the stage of the temperature (To) of the outdoor air (OA) shifts toward lower stages, the upper humidity limit (RL) associated with the stage of the temperature (To) of the outdoor air (OA) decreases.

11. The ventilation device of claim 2, wherein
the index of the moisture content in the room air (RA) is an absolute humidity (Rzr) of the room air (RA).

12. The ventilation device of claim 3, wherein
the index of the moisture content in the room air (RA) is an absolute humidity (Rzr) of the room air (RA).

13. The ventilation device of claim 4, wherein
the index of the moisture content in the room air (RA) is an absolute humidity (Rzr) of the room air (RA).

14. The ventilation device of claim 5, wherein
the index of the moisture content in the room air (RA) is an absolute humidity (Rzr) of the room air (RA).

15. The ventilation device of claim 7, wherein
the index of the moisture content in the room air (RA) is an absolute humidity (Rzr) of the room air (RA).

16. The ventilation device of claim 8, wherein
the index of the moisture content in the room air (RA) is an absolute humidity (Rzr) of the room air (RA).

17. The ventilation device of claim 9, wherein
the index of the moisture content in the room air (RA) is an absolute humidity (Rzr) of the room air (RA).

18. The ventilation device of claim 10, wherein
the index of the moisture content in the room air (RA) is an absolute humidity (Rzr) of the room air (RA).

* * * * *